United States Patent [19]

Solowy

[11] 4,245,663
[45] Jan. 20, 1981

[54] VALVE WITH CONDENSATE RECOVERY DEVICE

[75] Inventor: Jean Solowy, Sens, France

[73] Assignee: FMC Corporation, San Jose, Calif.

[21] Appl. No.: 53,461

[22] Filed: Jun. 29, 1979

[51] Int. Cl.³ ............................ F16K 17/19; F16T 1/20
[52] U.S. Cl. ................................... 137/192; 137/488; 137/492
[58] Field of Search .............. 137/492, 488, 489, 491, 137/177, 183, 192

[56] References Cited

U.S. PATENT DOCUMENTS

| | | | |
|---|---|---|---|
| 3,592,224 | 7/1971 | Bois | 137/492 |
| 3,618,893 | 11/1971 | Bois | 251/364 X |
| 3,828,808 | 8/1974 | Glos | 137/192 X |

*Primary Examiner*—Alan Cohan
*Attorney, Agent, or Firm*—W. W. Ritt, Jr.; J. F. Verhoeven

[57] ABSTRACT

A pressure relief valve of the diaphragm type having a condensate recovery device. The condensate recovery device is connected to the disc of the relief valve and provides means for moving condensate from an upper control chamber to either an inlet chamber or to a discharge chamber depending upon the relative pressures of the inlet and discharge chambers. Condensate from the control chamber enters a passageway in the recovery device through an inlet check valve and flows from the passageway through one of two inlet check valves into another chamber having a pressure higher than the pressure in the passageway. Each of the check valves includes a valve seat connected to one of the chambers and a ball which sits on the seat during the absence of any condensate in the passageway. Any condensate in the control chamber causes the ball at the inlet valve to float off the inlet seat and allows the condensate to enter the passageway. Condensate in the passageway causes one of the balls at the inlet valves to float and to pass the condensate to a chamber having a pressure higher than the control chamber.

13 Claims, 3 Drawing Figures

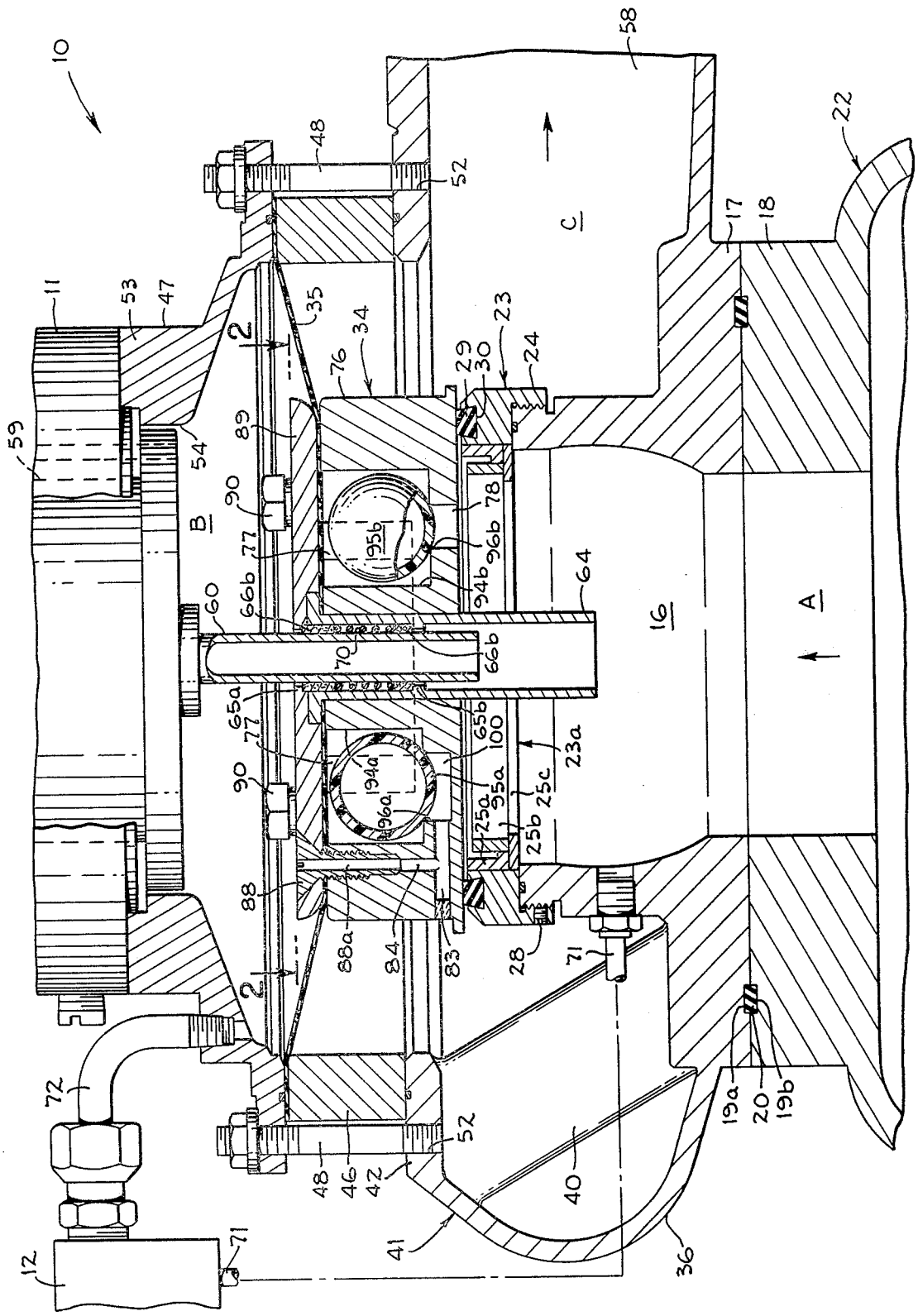

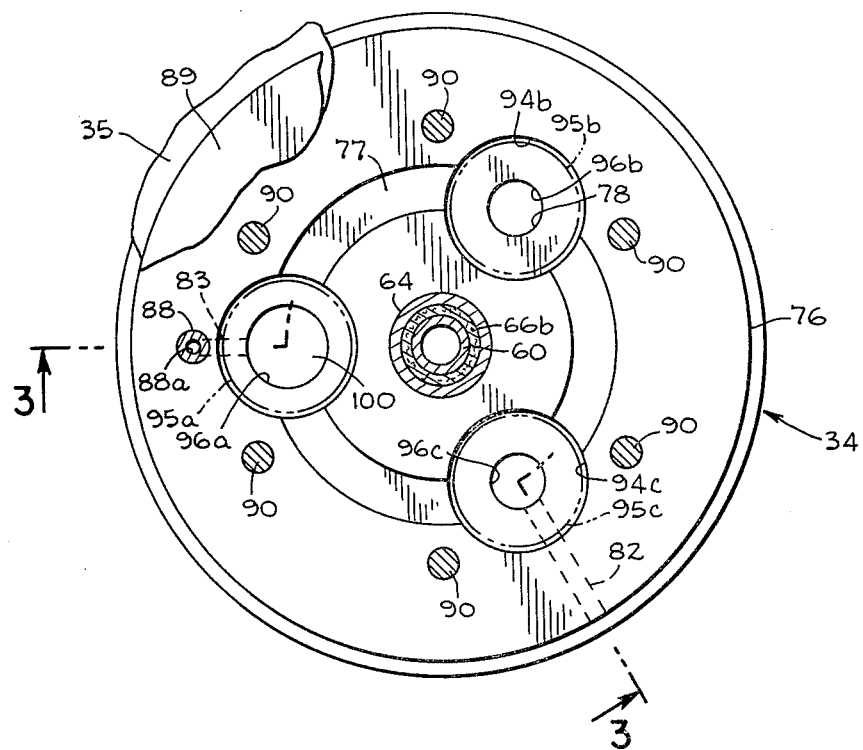
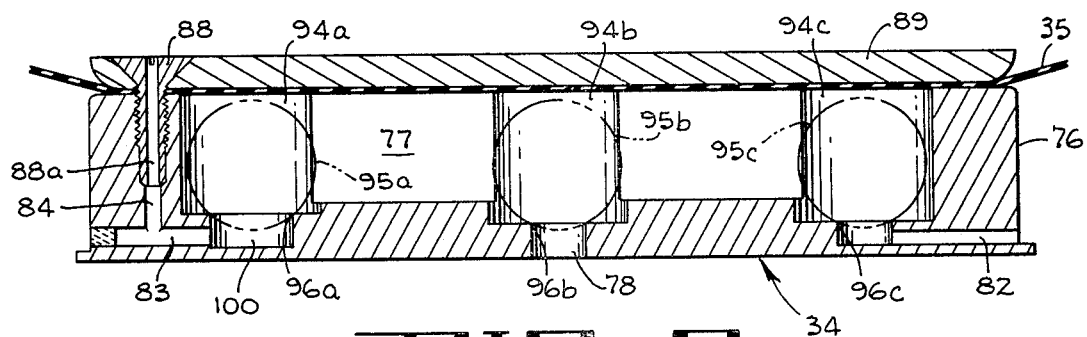

VALVE WITH CONDENSATE RECOVERY DEVICE

BACKGROUND OF THE INVENTION

1. Field of the Invention

This invention relates to an improved pressure and vacuum relief safety valve having a movable diaphragm, and more particularly to a safety valve having means for removing condensate from a control chamber.

2. Description of the Prior Art

Relief valves are widely employed throughout many industries to relieve the pressure in containers such as storage tanks, boilers and pipelines to prevent damage to these containers due to excessive pressures or to excessive vacuums. Some of the simpler relief valves employ a spring to bias a diaphragm over an opening to retain gas or fluid in the container until the inside pressure reaches a predetermined value, then allow the diaphragm to move away from the opening to relieve the excessive pressure or the excessive vacuum. More accurate control of the inside pressure can be obtained by using a relief valve without a spring and employing one or more pilot valves to control the opening and closing of the diaphragm. Such a combination is disclosed in U.S. Pat. No. 3,592,224, issued to L. Bois on July 13, 1971. A device of this type affords many advantages, especially opening and closing of the valves corresponding to very precise pressure values which may be very close to the predetermined opening value, and such devices also work quite well while the storage temperature is nearer the ambient temperature. However, when the storage temperature is above the ambient temperature, condensates may form in a pressure control chamber of the relief valve, and these condensates may interfere with the operation of the valve. Accordingly, what is needed is a device for removing the condensate from the pressure control chamber, and for either returning the condensate to the storage container or venting the condensate to the atmosphere.

SUMMARY OF THE INVENTION

The pressure relief valve of the present invention is employed to relieve pressure and vacuum conditions in pipelines and storage containers with greater accuracy by removing condensates which accumulate in a pressure control chamber of the valve. The relief valve includes a diaphragm mounted to isolate the pressure control chamber from an inlet chamber and from a discharge chamber. A closing member connected to the diaphragm selectively connects the inlet chamber to the discharge chamber whenever the pressure in the inlet chamber rises above a predetermined upper value or drops below a predetermined lower value. The presence of condensate in the control chamber selectively causes a first valve means to connect the control chamber to the inlet chamber or causes a second valve means to connect the control chamber to the discharge chamber.

BRIEF DESCRIPTION OF THE DRAWINGS

FIG. 1 is a cross-section of a pressure relief valve having a condensate recovery device according to the present invention, one of the balls being revolved into the plane of section.

FIG. 2 is a view of the pressure relief valve taken in the direction of the arrows 2—2 of FIG. 1.

FIG. 3 is a cross-section of the condensate recovery portion of the pressure relief valve taken on line 3—3 of FIG. 2.

DESCRIPTION OF THE PREFERRED EMBODIMENT

The relief valve system shown in FIG. 1 generally comprises a diaphragm type relief valve 10, a pilot pressure valve 11 and a vacuum pilot valve 12. This type of system is commonly employed to protect storage vessels and pipelines from rupture. The relief valve 10 includes an inlet pipe section 16 with an integral flange 17 for attachment to a corresponding flange 18 forming part of a storage tank or product transport pipe 22. The flanges 17,18 each have an annular groove 19a,19b to receive a packing 20 which provides a seal between the storage tank 22 and the valve 10. In the illustrated preferred embodiment, the inlet pipe section 16 is, preferably, but not necessarily, provided on its upper end with an anti-vibration seat assembly 23 of the type described in detail in the U.S. Pat. No. 3,618,893 issued to Bois on Nov. 9, 1971. The seat assembly consists of an annular body 24 threaded to the upper end of the inlet pipe section 16 and retained in position by one or more set-screws 28, and an annular floating portion 23a. The floating portion includes a plurality of annular rings 25a–25c mounted inside the body 24. A wedge-shaped annular seal 29 is mounted in a groove 30 in the upper end of the annular body 24 for engagement with a closing member 34 supported on a flexible diaphragm 35.

A curved, generally toroidal shaped outer wall 36 which surrounds the inlet pipe 16 and has stiffening ribs 40, forms a body 41 of the relief valve 10. The upper part of the body 41 is open with a flange 42 having an annular ring 46 mounted thereon. The outer periphery of the diaphragm 35 is secured between the upper edge of the annular ring 46 and a cover plate 47 to retain the diaphragm and seal the body of the relief valve. The cover plate 47 is secured to the body 41 by a plurality of bolts 48 which are threaded into holes 52 in the flange 42.

In its closed position, the relief valve 10 is divided into three chambers, chamber A defined by the inlet pipe 16, an upper control chamber B between the diaphragm 35 and the cover 47, and a lower annular discharge chamber C. The central part of the cover 47 has a circular flange 53 with a central bore 54 on which the pilot valve 11 is mounted and sealed in a conventional manner. An exhaust port 58 in the curved outer wall 36 provides the means of conducting the released pressure from the discharge chamber C to the outside atmosphere or to a container having near atmospheric pressure.

The pressure pilot valve 11 includes an internal channel 59 that connects the internal portion of the valve 11 with the control chamber B of the relief valve 10. A hollow guide tube 60, rigidly connected to the pressure valve 11, extends downwardly into an outer tube 64 which extends into the inlet pipe section 16. The outer tube 64 includes a radially inwardly projecting pair of guide elements 65a,65b, which elements also serve to retain a pair of packing seals 66a,66b in the area between the guide tube 60 and the outer tube. A helical spring 70 presses against the seals 66a,66b to provide a pressure tight barrier between the guide tube and the outer tube.

The vacuum pilot valve 12 is connected to the inlet chamber A by line 71 which provides inlet pressure to the valve 12, and is also connected to the control chamber B by a conduit 72 which selectively provides pressure to the chamber B. Details of the vacuum pilot valve 12 and of the pressure pilot valve 11 are disclosed in the aforementioned Bois U.S. Pat. No. 3,592,224, and such details are not considered to be critical to the present invention.

The closing member 34 includes a condensate recovery device for removing condensate from the control chamber B and for directing the recovered condensate to either the inlet chamber A or to the discharge chamber C. The recovery device comprises an annular body member 76 having an annular passageway 77 communicating with the inlet chamber A through an inlet port 78 (FIGS. 1-3), with the discharge chamber C through a passage 82 (FIGS. 2,3), and with the control chamber B through a pair of passages 83,84. Mounted in the passage 84 is a screw 88 having a longitudinal bore 88a to conduct the condensate from the chamber B into the passage 84. A disc 89 (FIGS. 1-3), is secured to the upper portion of the body member 76 by a plurality of cap screws 90 (FIGS. 1-2), and the diaphragm 35 is mounted between the disc 89 and the body member 76.

Spaced around the passageway 77 are a plurality of generally cylindrical shaped cavities 94a-94c (FIGS. 2,3), each having a diameter considerably greater than the width of the passageway 77. Mounted inside each of the cavities 94a-94c is a hollow ball 95a-95c made of a material such as Teflon, although the type of material and the weight of the balls are determined by the characteristics of the condensate contained in the chamber B. Each of the balls 95a-95c, together with its associated cavity 94a-94c and annular seat 96a-96c, forms a check valve to allow the condensate to flow from the control chamber B to one of the chambers A and C while preventing flow in the reverse direction.

When condensate forms in the control chamber B it moves downward through the screw bore 88a and the passage 84, and then through the horizontal passage 83 into a cavity 100 below the ball 95a (FIGS. 1-3), forcing the ball 95a off its seat 96a so that the condensate flows on into the annular passageway 77 (FIGS. 1,2). When the pressure in the inlet chamber A is higher than the pressure in the discharge chamber C the ball 95b (FIGS. 1-3) is lifted off its seat 96b by the pressure in chamber A, allowing the condensate to flow from the passageway 77 into the inlet chamber A, during which the lower pressure in the chamber C holds the ball 95c (FIGS. 2-3) on its seat 96c to prevent the condensate from flowing into chamber C.

When the pressure in the discharge chamber C is higher than the pressure in the inlet chamber A, the ball 95c (FIGS. 2,3) is lifted off its seat 96c by the pressure in chamber C, allowing the condensate to flow from the passageway 77 into the passage 82 and into the discharge chamber C, and the lower pressure in the chamber A holds the ball 95b (FIGS. 2-3) on its seat 96b to prevent the condensate from flowing into the inlet chamber A.

The relief valve system shown in FIG. 1 has four modes of operation. The first and second modes are involved when pressure is present in the storage container, the first mode retaining the pressure in the container, and the second mode releasing excess pressure when it exceeds the limits set by the pressure pilot valve 11. The third and fourth modes of operation are involved when a vacuum is present in the storage tank; in the third mode the relief valve remains closed under a normal vacuum, whereas in the fourth mode the vacuum pilot valve 12 functions to open the relief valve 10 to relieve the excess vacuum in the storage tank and prevent implosion.

When the storage tank 22 is subjected to normal pressures within the range set for the valve unit, the pressure from the tank is transmitted through the tubes 64,60 to the pressure pilot valve which transmits the tank pressure into the control chamber B above the diaphragm via the channel 59. Since the pressures in chambers A and B are identical, the relief valve 10 remains closed as the surface area above the diaphragm is greater than the surface area of the closing member 34 which is subjected to the pressure in chamber A, below the closing member. In this mode the vacuum pilot valve 12 is also inoperative and does not affect the position of the closing member 34.

The second mode of operation of the relief valve is in response to an excess pressure condition in the storage tank 22 and inlet chamber A. The pressure from chamber A is conducted upwardly through tubes 64 and 60 into the pressure pilot valve 11 causing the valve 11 to connect the internal channel 59 to the atmosphere and causing the pressure in chamber B above the diaphragm 35 to escape through the channel 59 to the atmosphere. In response to the lowering of the pressure in chamber B, the diaphragm 35 and the closing member 34 rise, opening the relief valve and permitting the gas or liquid in the storage tank 22 to escape into the relief valve body of chamber C and to the atmosphere via the exhaust port 58.

When the pressure in the storage tank and the inlet chamber A drops to a value below that determined by the pressure pilot valve 11, the relief valve is closed because the static pressure in chamber B is greater than the pressure in chambers A and C.

In the third mode of operation the storage tank may be subjected to a vacuum within the specified range where it is not desirable for the relief valve 10 to open. In this mode the vacuum pilot valve 12 remains inoperative, and the relief valve 10 remains in the closed position shown in FIG. 1.

In the fourth mode of operation the vacuum in chamber A exceeds the value needed to render the vacuum pilot valve 12 operative. The value of vacuum in chamber A is coupled to the pilot valve by the line 71 causing the vacuum in chamber A to be coupled through the pilot valve 12 to the control chamber B by the conduit 72. Since the amount of vacuum in chamber B is equal to that of chamber A, and since the pressure in the discharge chamber C is greater than either of these, the diaphragm 35 is forced in an upward direction causing the closing member 34 to raise off the annular seal 29, permitting an inward flow of air from the atmosphere through chambers C and A until the value of the vacuum in the chamber A is less than that required to actuate the vacuum pilot valve 12. Consequently, the closing member 34 mounted on the flexible diaphragm 35 lowers, closing the inlet pipe 16 to the storage tank 22.

The present invention provides a simple and inexpensive device for removing condensate from one chamber of a multi-chamber apparatus and for directing the condensate to one of the other chambers. The invention is especially useful with pressure relief valves having a plurality of chambers, but can be used with other types of apparatus.

Although the best mode contemplated for carrying out the present invention has been herein shown and described, it will be apparent that modification and variation may be made without departing from what is regarded to be the subject matter of the invention.

What is claimed is:

1. A condensate recovery device for use with apparatus having a control chamber from which the condensate is to be removed and a plurality of other chambers to which the condensate can be conducted, said device comprising:

a diaphragm mounted to separate said control chamber from said other chambers;

a body member having a passageway therein;

a first valve means connected between said passageway and said control chamber;

means for opening said first valve means in response to the presence of condensate in said control chamber to allow the flow of condensate into said passageway;

a plurality of other valve means;

means for connecting each of said other valve means between said passageway and a corresponding one of said other chambers; and means for opening one of said other valve means in response to the relative values of pressure in said other chambers to allow the flow of condensate from said passageway into one of said other chambers.

2. A condensate recovery device as defined in claim 1 wherein said means for opening one of said other valve means includes means for opening only the valve means to the other chamber having the highest value of pressure therein.

3. A condensate recovery device as defined in claim 1 wherein each of said valve means includes a ball, a valve seat, means for guiding said ball onto said valve seat to close said valve in the absence of any condensate, and means for floating said ball on said condensate to lift said ball from said valve seat to thereby open said valve means.

4. A pressure relief valve having a condensate recovery device for removing condensate from a pressure control chamber of the valve and for conducting said condensate to either an inlet chamber of said relief valve or to a discharge chamber of said relief valve, said relief valve comprising:

a diaphragm mounted to separate said pressure control chamber from said inlet chamber and from said discharge chamber, a closing member connected to said diaphragm to selectively connect said inlet chamber to said discharge chamber and to selectively isolate said inlet chamber from said discharge chamber;

a first valve means mounted between said control chamber and said inlet chamber;

means for opening said first valve means to selectively connect said control chamber to said inlet chamber in response to an accumulation of condensate in said control chamber;

a second valve means mounted between said control chamber and said discharge chamber; and means for opening said second valve to selectively connect said control chamber to said discharge chamber in response to an accumulation of condensate in said control chamber.

5. A pressure relief valve as defined in claim 4 including means for opening only one of said first and said second valve means at any one time.

6. A pressure relief valve as defined in claim 4 including means for opening the one of said first and said second valve means connected to the chamber having the higher pressure.

7. A pressure relief valve as defined in claim 4 including means for interconnecting said inlet and said discharge chambers when the pressure in said inlet chamber decreases below a predetermined value.

8. A pressure relief valve as defined in claim 4 including means for connecting said inlet chamber to said discharge chamber when the pressure in said inlet chamber increases above a predetermined value.

9. A pressure relief valve having a condensate recovery device for removing condensate from a pressure control chamber of the valve and for conducting said condensate to either an inlet chamber of said relief valve or to a discharge chamber of said relief valve, said relief valve comprising:

a diaphragm mounted to separate said pressure control chamber from said inlet chamber and from said discharge chamber;

a closing member having a passageway therein;

means for mounting said closing member to said diaphragm to selectively connect said inlet chamber to said discharge chamber and to selectively isolate said inlet chamber from said discharge chamber;

a first valve means connected between said control chamber and said passageway in said closing member;

means for opening said first valve means to selectively connect said control chamber to said passageway in response to an accumulation of condensate in said control chamber to allow the flow of condensate into said passageway;

a second valve means connected between said inlet chamber and said passageway;

a third valve means connected between said discharged chamber and said passageway; and means for selectively opening one of said second and said third valve means to allow the flow of condensate from said passageway into said inlet chamber or into said discharge chamber.

10. A pressure relief valve as defined in claim 9 wherein each of said valve means includes a ball, a valve seat, means for guiding said ball onto said valve seat to close said valve in the absence of any condensate, and means for floating said ball on said condensate to lift said ball from said valve seat to open said valve means.

11. A pressure relief valve as defined in claim 9 wherein said means for opening one of said second and said third valve means includes means for opening only the valve means connected to the chamber having the highest value of pressure therein.

12. A pressure relief valve as defined in claim 9 including means for connecting said inlet chamber to said discharge chamber when the pressure in said inlet chamber rises above a predetermined value.

13. A pressure relief valve as defined in claim 9 including means for connecting said inlet chamber to said discharge chamber when the pressure in said inlet chamber drops below a predetermined value.

* * * * *